US012668103B2

(12) United States Patent (10) Patent No.: US 12,668,103 B2
Yahia et al. (45) Date of Patent: Jun. 30, 2026

(54) THERMAL MANAGEMENT DEVICE FOR THE BATTERIES OF AN ELECTRIC OR HYBRID VEHICLE

(71) Applicant: VALEO SYSTEMES THERMIQUES, Le Mesnil-Saint-Denis (FR)

(72) Inventors: Mohamed Yahia, Le Mesnil-Saint-Denis (FR); Bertrand Nicolas, Le Mesnil Saint-Denis (FR); Stefan Karl, Le Mesnil-Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 116 days.

(21) Appl. No.: 18/686,063

(22) PCT Filed: Aug. 25, 2022

(86) PCT No.: PCT/EP2022/073695
§ 371 (c)(1),
(2) Date: Feb. 23, 2024

(87) PCT Pub. No.: WO2023/025898
PCT Pub. Date: Mar. 2, 2023

(65) Prior Publication Data
US 2024/0375483 A1     Nov. 14, 2024

(30) Foreign Application Priority Data

Aug. 26, 2021    (FR) ...................................... 2108932

(51) Int. Cl.
B60H 1/00          (2006.01)
(52) U.S. Cl.
CPC ..... B60H 1/00914 (2013.01); B60H 1/00278 (2013.01); B60H 1/00392 (2013.01); B60H 1/004 (2013.01)

(58) Field of Classification Search
CPC ............ B60H 1/00914; B60H 1/00278; B60H 1/00392; B60H 1/004; B60H 1/00907;
(Continued)

(56) References Cited

U.S. PATENT DOCUMENTS 11,541,719 B1 *   1/2023   Richardson ............ B60H 1/004
2013/0312442 A1   11/2013   Suzuki et al.
(Continued)

FOREIGN PATENT DOCUMENTS

CN         108749518 A * 11/2018   ......... B60H 1/00007
DE      112019003620 T5    4/2021
(Continued)

OTHER PUBLICATIONS

International Search Report Issued in Corresponding PCT Application No. PCT/EP2022/073695, dated Dec. 1, 2022. (6 Pages with English Translation).
(Continued)

*Primary Examiner* — Kun Kai Ma
(74) *Attorney, Agent, or Firm* — Osha Bergman Watanabe & Burton LLP

(57) ABSTRACT
A thermal management device for an electric or hybrid motor vehicle is disclosed. The thermal management device includes a reversible circulation circuit configured to circulate a refrigerant fluid. The reversible circulation circuit includes a main loop, a first bypass branch, and a second bypass branch. The main loop includes, in the direction of circulation of the refrigerant fluid, a compressor, an internal heat exchanger configured to directly or indirectly heat a flow of internal air en route to the vehicle interior, a first expansion device, and a first heat exchanger. The first bypass branch includes a second expansion device disposed upstream of a cooler. The cooler is configured to cool the batteries and/or the electric powertrain of the motor vehicle. The first bypass branch is connected in parallel at least with the first heat exchanger.

14 Claims, 4 Drawing Sheets

Figure 1:
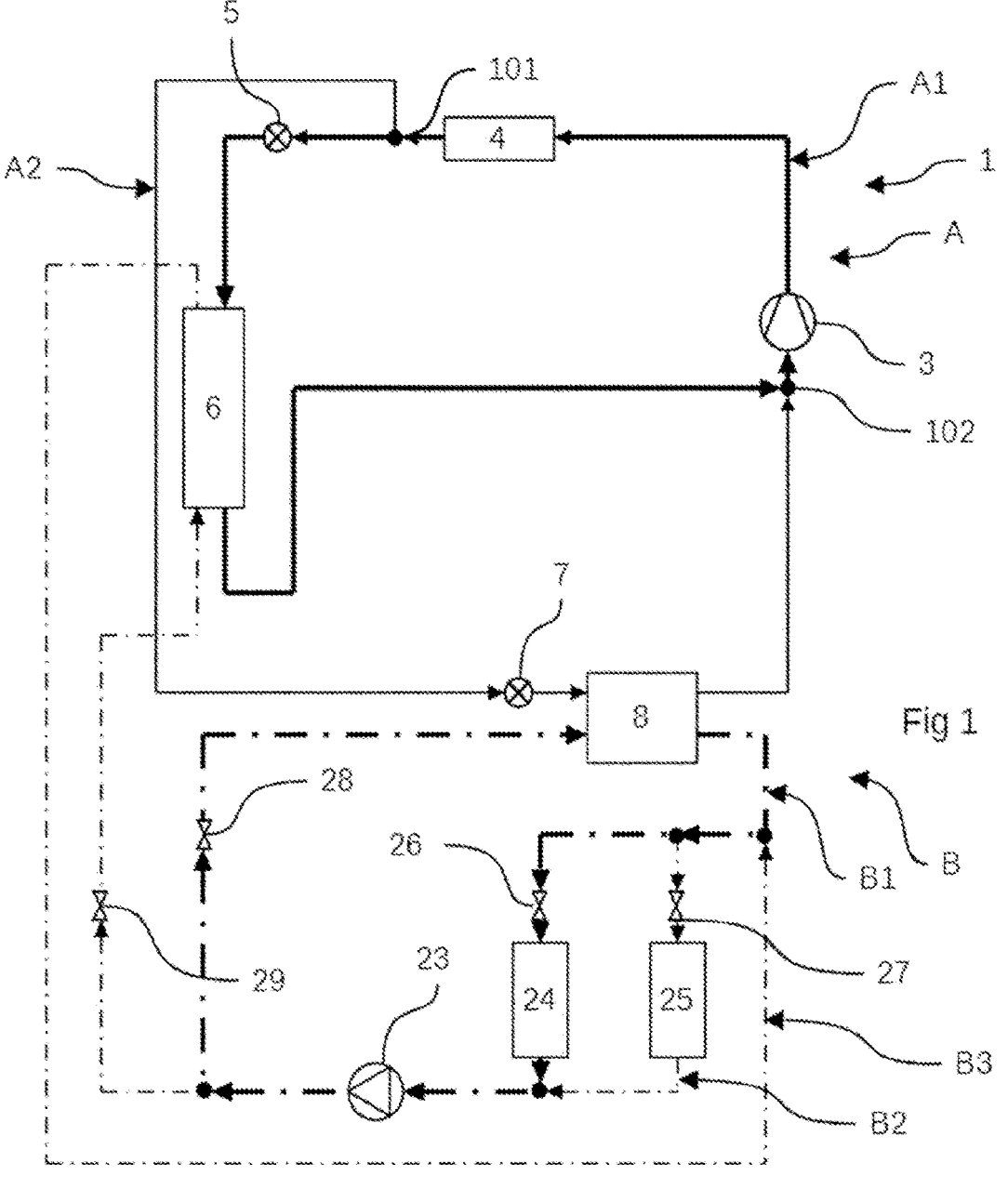

(58) Field of Classification Search
CPC ...... B60H 1/32284; B60H 2001/00949; B60H
1/00921; B60H 2001/00307; F25B
2400/0403; F25B 2400/0409; F25B 5/02
See application file for complete search history.

(56) References Cited

U.S. PATENT DOCUMENTS

| | | | |
|---|---|---|---|
| 2019/0351740 A1* | 11/2019 | Filipkowski ....... | B60H 1/32284 |
| 2020/0047586 A1* | 2/2020 | Gonze ................ | B60H 1/00385 |
| 2020/0139788 A1 | 5/2020 | Dong et al. | |
| 2022/0410653 A1* | 12/2022 | Li ...................... | B60H 1/00035 |

FOREIGN PATENT DOCUMENTS

| | | | | |
|---|---|---|---|---|
| FR | 3104493 A1 | 6/2021 | | |
| JP | 2020055344 A | 4/2020 | | |
| KR | 20170013700 A | 2/2017 | | |
| WO | WO-2013087425 A1 * | 6/2013 | .............. | B60L 1/003 |
| WO | WO-2018124789 A1 * | 7/2018 | ......... | B60H 1/00921 |
| WO | WO-2020152420 A1 * | 7/2020 | ............. | B60H 1/323 |
| WO | WO-2022252653 A1 * | 12/2022 | ........... | B60H 1/3208 |

OTHER PUBLICATIONS

Written Opinion of the International Research Administration issued in corresponding PCT Application No. PCT/EP2022/073695, dated Dec. 1, 2022. (6 Pages).

\* cited by examiner

THERMAL MANAGEMENT DEVICE FOR THE BATTERIES OF AN ELECTRIC OR HYBRID VEHICLE

The invention relates to the field of electric and hybrid motor vehicles and more particularly to a device for thermal management, notably in heat pump mode.

Current electric or hybrid motor vehicles increasingly comprise a means for thermal management of the vehicle interior, notably in order to heat the vehicle interior. Such a thermal management means is generally a refrigerant-fluid circulation circuit which works on the principle of a heat pump. Such a heat pump works in that a heat exchanger through which a flow of external air passes and which acts as an evaporator draws heat from the ambient air outside the motor vehicle. This heat is reinjected into a flow of internal air intended for the vehicle interior by another heat exchanger, for example an internal condenser. A heat pump consumes a relatively large amount of electrical energy since it is necessary to make a compressor rotate to allow the pressurization of the refrigerant fluid.

To limit the electrical consumption in the field of hybrid or electric motor vehicles, it is known to couple the system for thermal management of the vehicle interior to a system for thermal management of the batteries and/or the electric powertrain in order to recover heat at said batteries and/or the electric powertrain. However, the current architectures are not satisfactory, since the refrigerant fluid successively enters an expansion device, a first heat exchanger configured to absorb heat from the outside ambient air and then once more another expansion device and a second heat exchanger configured to recover heat coming from the batteries and/or the electric powertrain. This succession of expansion devices and heat exchangers causes pressure drops which have an impact on the compressor. Specifically, these pressure drops require more suction power and thus the use of a more powerful compressor, which consumes more energy.

One of the aims of the present invention is therefore to overcome at least some of the drawbacks of the prior art and propose an improved management device, notably in heat pump mode, with heat recovery at the batteries and/or the electric powertrain.

The present invention therefore relates to a thermal management device for an electric or hybrid motor vehicle, said thermal management device comprising a reversible circulation circuit in which a refrigerant fluid is intended to circulate and which comprises:

a main loop having, in the direction of circulation of the refrigerant fluid: a compressor, an internal condenser intended to directly or indirectly heat a flow of internal air intended for the vehicle interior, a first expansion device and a first heat exchanger, a first bypass branch, which is connected in parallel at least with the first heat exchanger and has a second expansion device disposed upstream of a cooler, said cooler being intended to cool the batteries and/or the electric powertrain of the motor vehicle, and a second bypass branch for bypassing the internal condenser and the first expansion device.

According to one aspect of the invention, the first heat exchanger is disposed both on the circulation circuit and on an auxiliary circuit in which a heat transfer fluid is intended to circulate.

According to another aspect of the invention, the first bypass branch connects a first junction point disposed on the main loop upstream of the first expansion device, between the internal condenser and said first expansion device, to a second junction point disposed on the main loop upstream of the compressor, between the first heat exchanger and said compressor.

According to another aspect of the invention, the circulation circuit moreover comprises a third bypass branch connected in parallel with the second expansion device and with the cooler, said third bypass branch comprising a third expansion device disposed upstream of an evaporator through which a flow of internal air intended for the motor vehicle interior is intended to pass.

According to another aspect of the invention, the second bypass branch connects a third junction point disposed on the main loop downstream of the compressor, between said compressor and the internal condenser, to a fourth junction point disposed on the main loop downstream of the first expansion device, between said first expansion device and the first heat exchanger.

According to another aspect of the invention, the third bypass branch connects a fifth junction point disposed on the first bypass branch upstream of the second expansion device, between the first junction point and said second expansion device, to a sixth junction point disposed on the first bypass branch downstream of the cooler, between said cooler and the second junction point, the circulation circuit moreover comprising a fourth bypass branch connecting a seventh junction point disposed on the main loop downstream of the first heat exchanger, between said first heat exchanger and the second junction point, to an eighth junction point disposed upstream of the third expansion device, on the first bypass branch or the third bypass branch.

According to another aspect of the invention, the circulation circuit comprises an internal heat exchanger configured to allow exchanges of heat between a first side disposed on the fourth bypass branch and a second side disposed on the first bypass branch or on the third bypass branch, downstream of the evaporator.

According to another aspect of the invention, the second bypass branch connects a third junction point disposed on the main loop downstream of the compressor, between said compressor and the internal condenser, to a fourth junction point disposed on the main loop upstream of the second junction point, between the first heat exchanger and said second junction point, the first heat exchanger being configured to allow the circulation of refrigerant fluid within it in one direction or the other.

According to another aspect of the invention, the third bypass branch connects a fifth junction point disposed on the first bypass branch upstream of the second expansion device, between the first junction point and said second expansion device, to a sixth junction point disposed on the first bypass branch downstream of the cooler, between said cooler and the second junction point, the circulation circuit moreover comprising a fourth bypass branch connecting a seventh junction point disposed on the main loop downstream of the first expansion device, between said first expansion device and the first heat exchanger, to an eighth junction point disposed upstream of the third expansion device, on the first bypass branch or the third bypass branch.

According to another aspect of the invention, the circulation circuit comprises an internal heat exchanger configured to allow exchanges of heat between a first side disposed on the fourth bypass branch and a second side disposed on the first bypass branch or on the third bypass branch, downstream of the evaporator.

According to another aspect of the invention, the third bypass branch connects a fifth junction point disposed on the first bypass branch upstream of the second expansion device, between the first junction point and said second expansion device, to a sixth junction point disposed on the first bypass branch downstream of the cooler, between said cooler and the second junction point, the circulation circuit moreover comprising a fourth bypass branch connecting a seventh junction point disposed on the main loop downstream of the first expansion device, between said first expansion device and the first heat exchanger, to an eighth junction point disposed on the main loop upstream of the first expansion device, between the internal condenser and said first expansion device.

According to another aspect of the invention, the circulation circuit comprises an internal heat exchanger configured to allow exchanges of heat between a first side disposed on the fourth bypass branch and a second side disposed on the first bypass branch or on the third bypass branch, downstream of the evaporator.

According to another aspect of the invention, the third bypass branch connects a fifth junction point disposed on the main branch downstream of the first junction point, between said first junction point and the first expansion device, to a sixth junction point disposed on the first bypass branch downstream of the cooler, between said cooler and the second junction point, the first expansion device also being configured to allow the circulation of the refrigerant fluid within it in one direction or the other.

According to another aspect of the invention, the circulation circuit comprises an internal heat exchanger configured to allow exchanges of heat between a first side disposed on the main branch upstream of the first expansion device between the fifth junction point and said first expansion device and a second side disposed on the first bypass branch or on the third bypass branch downstream of the evaporator, said internal heat exchanger being configured to allow the circulation of the refrigerant fluid within its first side in one direction or the other.

According to another aspect of the invention, the first bypass branch connects a first junction point disposed on the main loop downstream of the first expansion device, between said first expansion device and the first heat exchanger, to a second junction point disposed on the main loop upstream of the compressor, between the first heat exchanger and said compressor, the second bypass branch connecting a third junction point disposed on the main loop downstream of the compressor, between said compressor and the internal condenser, to a fourth junction point disposed on the main loop upstream of the second junction point, between the first heat exchanger and said second junction point, the first heat exchanger being configured to allow the circulation of refrigerant fluid within it in one direction or the other.

According to another aspect of the invention, the circulation circuit comprises an internal heat exchanger configured to allow exchanges of heat between a first side disposed on the main branch downstream of the first junction point, between said first junction point and the first heat exchanger, and a second side disposed on the first bypass branch or on the third bypass branch downstream of the evaporator, said internal heat exchanger being configured to allow the circulation of the refrigerant fluid within its first side in one direction or the other, the first side of the heat exchanger having a pressure drop equal to the pressure drop in the second expansion device when the latter is open to its maximum extent.

Figure 2:
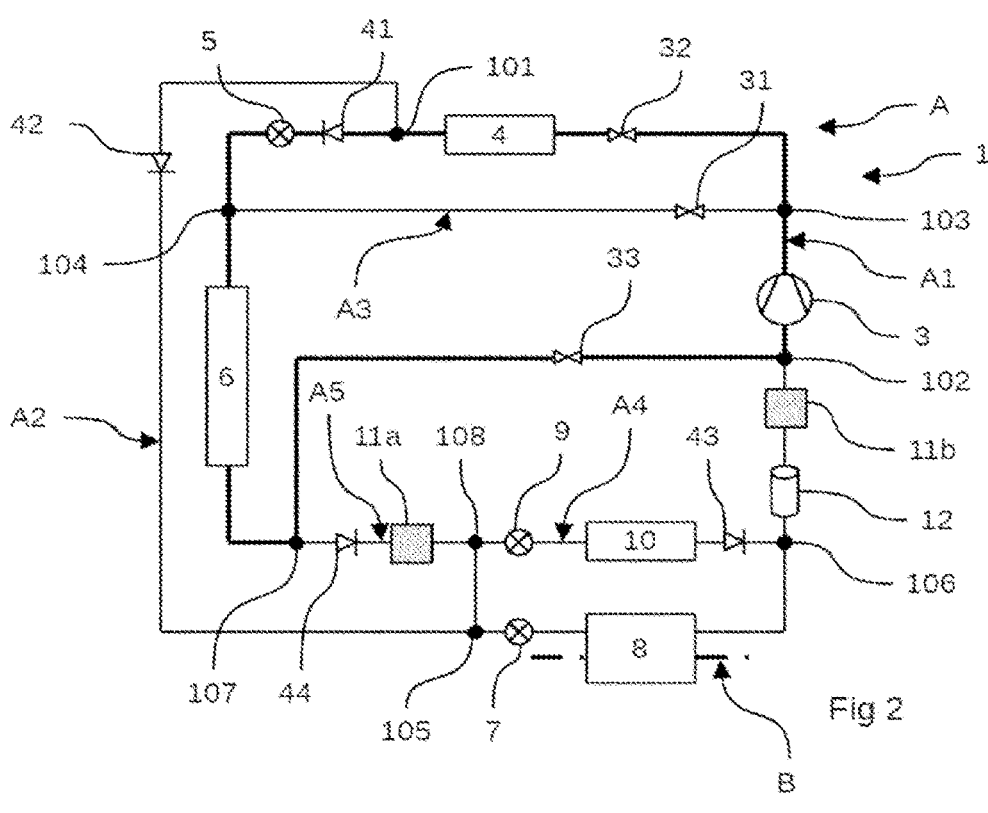
Figure 3:
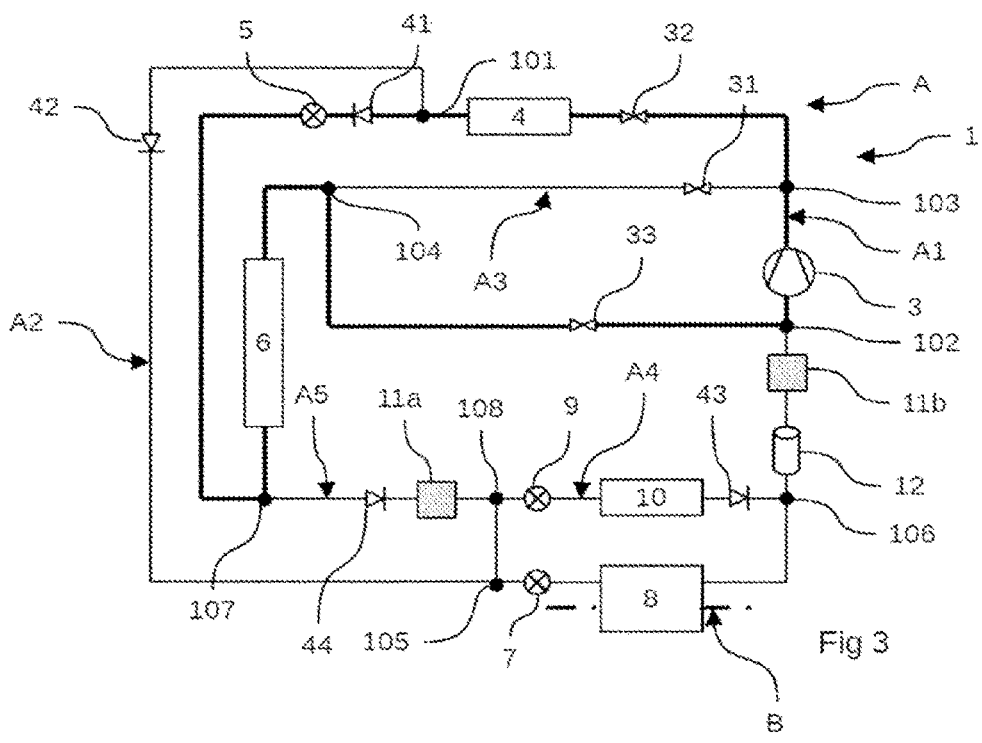
Figure 4:
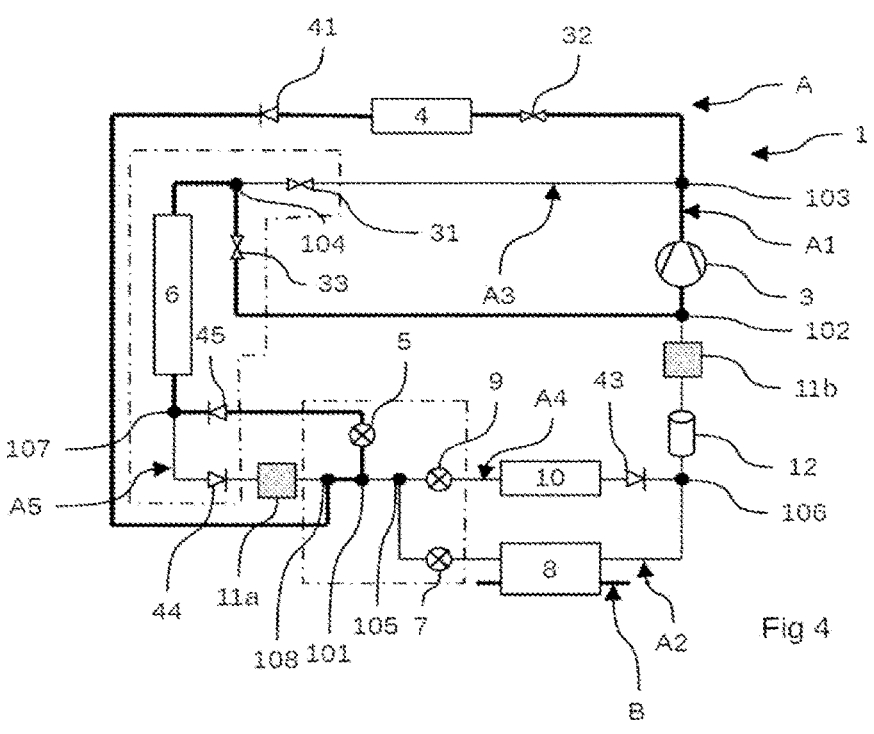
Figure 5:
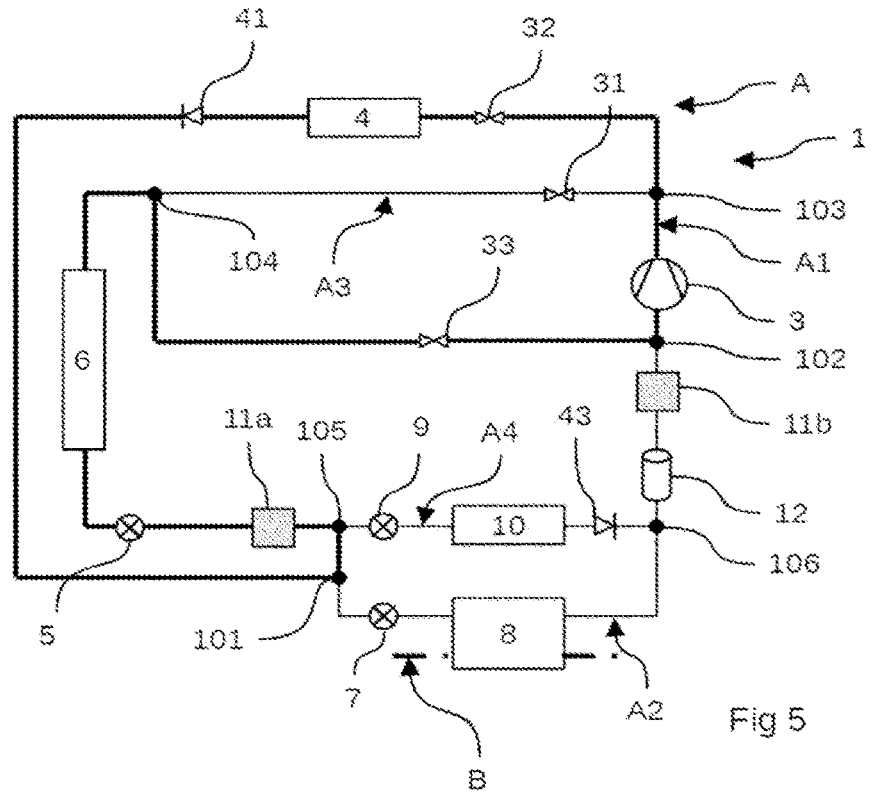
Figure 6:
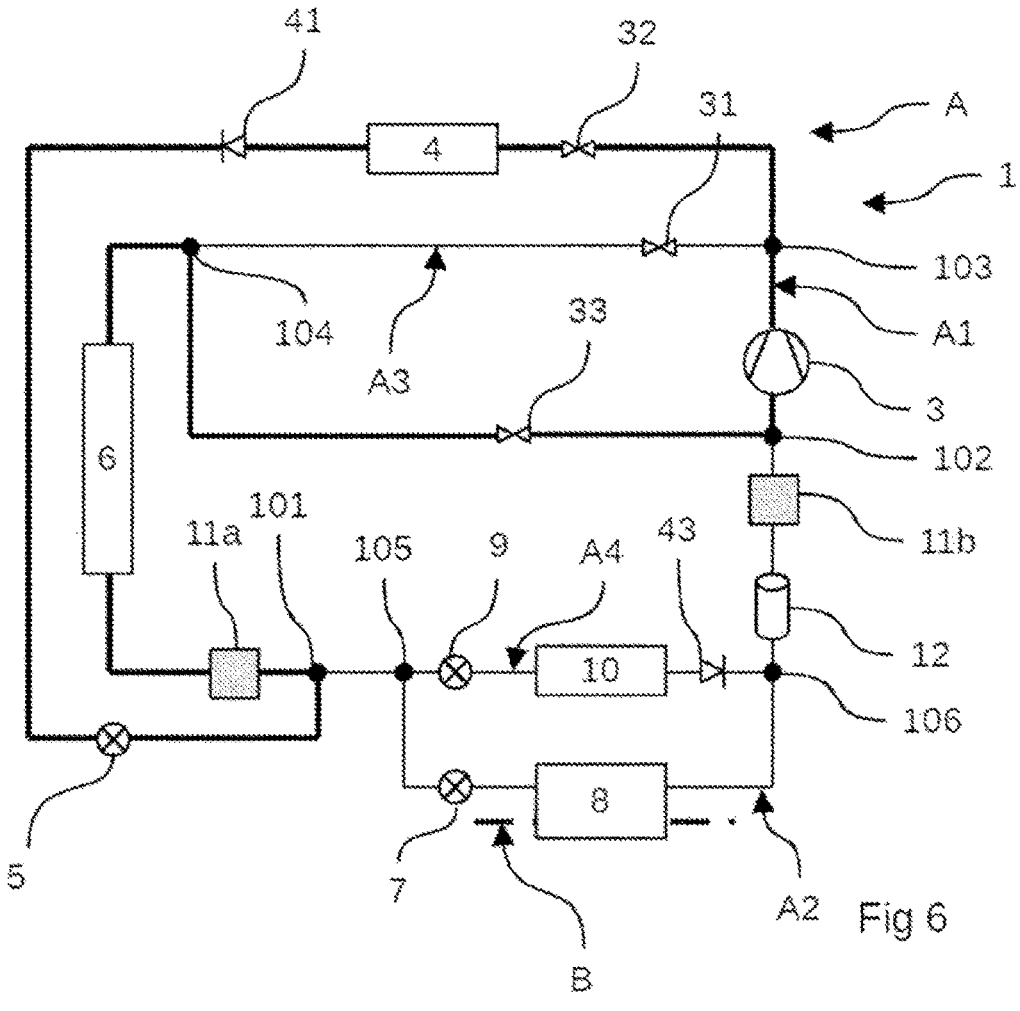

Further features and advantages of the present invention will become more clearly apparent from reading the following description, which is given by way of non-limiting illustration, and with reference to the accompanying drawings, in which:

FIG. 1 is a schematic depiction of a thermal management device according to a first embodiment, FIG. 2 is a schematic depiction of a thermal management device according to a second embodiment, FIG. 3 is a schematic depiction of a thermal management device according to a third embodiment, FIG. 4 is a schematic depiction of a thermal management device according to a fourth embodiment, FIG. 5 is a schematic depiction of a thermal management device according to a fifth embodiment, FIG. 6 is a schematic depiction of a thermal management device according to a sixth embodiment.

In the various figures, identical elements bear the same reference numbers.

The following embodiments are examples. Although the description refers to one or more embodiments, this does not necessarily mean that each reference relates to the same embodiment, or that the features apply only to one embodiment. Individual features of different embodiments may also be combined and/or interchanged to provide other embodiments.

In the present description, some elements or parameters may be indexed, such as, for example, first element or second element, and also first parameter and second parameter or else first criterion and second criterion, etc. In this case, the indexing is simply to differentiate between, and denote, elements or parameters or criteria that are similar, but not identical. This indexing does not imply priority being given to one element, parameter or criterion over another, and such designations can be easily interchanged without departing from the scope of the present description. Neither does this indexing imply any chronological order for example in assessing any given criterion.

In the present description, "positioned upstream" is understood to mean that one element is positioned before another with respect to the direction of circulation of a fluid. By contrast, "positioned downstream" is understood to mean that one element is positioned after another with respect to the direction of circulation of the fluid. For the sake of clarity and understanding, the direction of circulation used to define that one element is upstream or downstream of another is generally that of a heat pump mode described in more detail later on in the description.

FIG. 1 shows a thermal management device 1 for an electric or hybrid motor vehicle. This thermal management device 1 comprises a circulation circuit A, in which a refrigerant fluid is intended to circulate and which comprises a main loop A1 and a first bypass branch A2.

The main loop A1 comprises, in the direction of circulation of the refrigerant fluid (illustrated by arrows): a compressor 3, an internal condenser 4 intended to directly or indirectly heat a flow of internal air intended for the vehicle interior, a first expansion device 5 and a first heat exchanger 6, and is disposed in conjunction with an auxiliary circuit B within which a heat transfer fluid is intended to circulate, as illustrated in FIG. 1. Such an auxiliary circuit B is described later on in the present description.

Another possibility is that it may be intended for a flow of air external to the motor vehicle to pass through the first heat exchanger 6. The first heat exchanger 6 may then be disposed on the front face of the motor vehicle.

It may be intended for a flow of internal air intended for the vehicle interior to pass through the internal condenser 4 directly. The internal condenser 4 is thus configured to directly heat this flow of internal air. The internal condenser 4 may thus be disposed within a heating and ventilating device. An alternative may be that the internal condenser 4 is disposed both on the main loop A1 and on an auxiliary loop (not depicted) within which a heat transfer fluid circulates. This auxiliary loop may comprise a pump and a radiator through which a flow of internal air intended for the vehicle interior is intended to pass. The internal condenser 4 is thus configured to indirectly heat this flow of internal air. The radiator in the auxiliary loop may for its part be disposed within a heating and ventilating device.

For its part, the first bypass branch A2 is connected in parallel at least with the first heat exchanger 6. The first bypass branch A2 comprises a second expansion device 7 disposed upstream of a cooler 8. This cooler 8 is notably intended to cool the batteries and/or the electric powertrain of the motor vehicle. The fact that the first bypass branch A2 with its cooler 8 is connected in parallel with the first heat exchanger 6 makes it possible to circulate the refrigerant fluid in parallel. This circulation of the refrigerant fluid in parallel limits the pressure drops it undergoes and thus the necessary power of the compressor 3 can be lower.

As shown in FIG. 1, the cooler 8 may notably be disposed both on the main loop A1 and on an auxiliary circuit B in which a heat transfer fluid is intended to circulate. This auxiliary circuit B comprises, for example, a main loop B1 comprising, in the direction of circulation of the heat transfer fluid: a pump 23, the cooler 8 and a heat exchanger 24 for exchanging heat with the batteries. Connected in parallel with the heat exchanger 24 for exchanging heat with the batteries, the main loop B1 also comprises a first bypass branch B2 comprising at least one exchanger 25 for exchange with a component of the electric powertrain. Electric powertrain is understood to mean, for example, the electric motor and the power electronics. In order to redirect the heat transfer fluid toward the heat exchanger 24 for exchanging heat with the batteries and/or toward the at least one exchanger 25 for exchange with a component of the electric powertrain, the auxiliary circuit may comprise valves 26, 27 disposed respectively upstream of the heat exchangers 24 and 25.

The main loop B1 may also comprise a second bypass branch B3 connected in parallel with the cooler 8. This second bypass branch B3 more particularly comprises the first heat exchanger 6 when the latter is connected both to the circulation circuit A and the auxiliary circuit B. In order to redirect the heat transfer fluid toward the first heat exchanger 6 and/or toward the cooler 8, the auxiliary circuit B may comprise valves 28, 29 disposed respectively upstream of the cooler 8 and of the first heat exchanger 6.

As a result, when the first heat exchanger 6 is disposed in conjunction with the auxiliary circuit B, it is possible to effectively recover heat from the batteries and/or the powertrain with limited pressure drops because the heat exchanger 6 and the cooler 8 are in parallel.

According to a first embodiment illustrated in FIGS. 1 to 5, the first bypass branch A2 connects a first junction point 101 disposed on the main loop A1 upstream of the first expansion device 5, between the internal condenser 4 and said first expansion device 5, to a second junction point 102 disposed on the main loop A1 upstream of the compressor 3, between the first heat exchanger 6 and said compressor 3.

According to this first embodiment, the first expansion device 5 and the second expansion device 7 can more particularly be electronic expansion valves with a shut-off function. Such a shut-off function makes it possible to block the flow of refrigerant fluid when the electronic expansion valve is closed. This thus makes it possible to control the flow of refrigerant fluid and thus to direct it toward the first heat exchanger 6 and/or through the first bypass branch A2.

In the example illustrated in FIG. 1, the refrigerant fluid circulates both in the first heat exchanger 6 and in the cooler 8. This is a heat pump operating mode with heat recovery. Within the auxiliary circuit B, the heat transfer fluid circulates both through the heat exchanger 24 for exchanging heat with the batteries and the at least one exchanger 25 for exchange with a component of the electric powertrain. Therefore, heat is recovered both at the batteries and at the electric powertrain.

In the example of FIG. 1, the thermal management device 1 and more particularly the circulation circuit A can only operate in a heat pump mode with or without heat recovery in order to heat the flow of internal air intended for the vehicle interior. The first heat exchanger 6 therefore solely has an evaporator function.

According to embodiments and variants illustrated in FIGS. 2 to 5, the circulation circuit A is reversible and moreover comprises a second bypass branch A3 for bypassing the internal condenser 4 and the first expansion device 5.

In order to also make it possible to cool a flow of internal air intended for the vehicle interior, the circulation circuit A may also comprise a third bypass branch A4 connected in parallel with the second expansion device 7 and the cooler 8. This third bypass branch A4 more particularly comprises a third expansion device 9 disposed upstream of an evaporator 10 through which a flow of internal air intended for the motor vehicle interior is intended to pass. This evaporator 10 may notably be disposed within a heating, ventilating and air conditioning device. The third expansion device 9 may also be an electronic expansion valve and have a shut-off function.

Reversible is understood to mean that the circulation circuit A can operate in a heat pump mode and a cooling mode. In the heat pump mode, the refrigerant fluid circulates in succession through the compressor 3, the internal condenser 4, the first expansion device 5, and the first heat exchanger 6, which in this operating mode acts as an evaporator, before returning to the compressor 3. As described above, the refrigerant fluid may also circulate in parallel through the first bypass branch A2 to recover heat.

In the embodiment, the refrigerant fluid may be used to cool the flow of internal air via the evaporator 10. The refrigerant fluid thus circulates in succession through the compressor 3, bypasses the internal condenser 4 via the second bypass branch A3, passes through the first heat exchanger 6, which in this embodiment acts as a condenser, and passes through the third expansion device 9 and the cooler 10 before reaching the compressor 3. The refrigerant fluid may also, in parallel with the third bypass branch A4, at the outlet of the first heat exchanger 6 pass through the second expansion device 7 and the cooler 8 to cool the heat transfer fluid in the auxiliary circuit B and therefore the batteries and/or the electric powertrain.

Still according to the embodiments and variants illustrated in FIGS. 2 to 5, the reversible circulation circuit A may moreover comprise an accumulator 12 for refrigerant fluid. This accumulator 12 is preferably disposed on the first bypass branch A2 upstream of the second junction point 102, between the sixth junction point 106 and said second junction point 102. The disposition of the accumulator notably makes it possible, in heat pump mode, for the refrigerant fluid at the outlet of the first heat exchanger 6 to not pass through said accumulator 12 and to reach the compressor 3 directly. This thus makes it possible to further limit the pressure drops and therefore an increase in the power and energy consumption of the compressor 3 to compensate for these pressure drops.

In order to control the flow of refrigerant fluid coming from the compressor 3 and to redirect it toward the internal condenser 4 or the second bypass branch A3, the circulation circuit A may comprise a first shut-off valve 31, disposed on said second bypass branch A3, and a second shut-off valve 32, disposed on the main loop A1 upstream of the internal condenser 4, between the third junction point 103 and said internal condenser 4. In order to avoid backflows toward the internal condenser 4, the main loop A1 may comprise a non-return valve 41 disposed downstream of said internal condenser 4. In order to avoid, notably in cooling mode, the refrigerant fluid bypassing the evaporator 10, a third shut-off valve 33 may be disposed on the main loop upstream of the second junction point 102. In order to avoid backflows of refrigerant fluid from the sixth junction point 106 toward the evaporator 10, the third bypass branch A4 may comprise a non-return valve 43 downstream of said evaporator 10.

According to a first connection variant for the second bypass branch A3 illustrated in FIG. 2, said second bypass branch A3 connects a third junction point 103 to a fourth junction point 104. The third junction point 103 is disposed on the main loop A1 downstream of the compressor 3, between said compressor 3 and the internal condenser 4. The fourth junction point 104 for its part is disposed on the main loop A1 downstream of the first expansion device 5, between said first expansion device 5 and the first heat exchanger 6.

In the example illustrated in FIG. 2, the third bypass branch A4 more particularly connects a fifth junction point 105 to a sixth junction point 106. The fifth junction point 105 is disposed on the first bypass branch A2 upstream of the second expansion device 7, between the first junction point 101 and said second expansion device 7. The sixth junction point 106 is disposed on the first bypass branch A2 downstream of the cooler 8, between said cooler 8 and the second junction point 102.

In order to be able to conduct the refrigerant fluid from the fluid outlet of the first heat exchanger 6, notably in a cooling mode, toward the second expansion device 7 and/or third expansion device 9, the circulation circuit A moreover comprises a fourth bypass branch A5. This fourth bypass branch A5 more particularly connects a seventh junction point 107 to an eighth junction point 108. The seventh junction point 107 is disposed on the main loop A1 downstream of the first heat exchanger 6, between said first heat exchanger 6 and the second junction point 102. The eighth junction point 108 for its part is disposed upstream of the third expansion device 9, on the first bypass branch A2 (not depicted) or on the third bypass branch A4 (as illustrated in FIG. 2).

In order to avoid backflows of refrigerant fluid within the fourth bypass branch A5 from the eighth junction point 108 toward the seventh junction point 107, notably when heat is being recovered via the cooler 8, the fourth bypass branch A5 may comprise a non-return valve 44. In the example of FIG. 2, the third shut-off valve 33 for its part is disposed on the main loop A1 between the seventh junction point 107 and the second junction point 102.

Still in the example illustrated in FIG. 2, the circulation circuit A may comprise an internal heat exchanger 11a, 11b configured to allow exchanges of heat between a first side 11a disposed on the fourth bypass branch A5 and a second side 11b disposed on the first bypass branch A2 or on the third bypass branch A4 downstream of the evaporator 10. In the example illustrated in FIG. 2, the second side 11b of the internal heat exchanger is disposed on the first bypass branch A2, between the sixth junction point 106 and the second junction point 102, more particularly downstream of the accumulator 12. This internal heat exchanger 11a, 11b notably makes it possible to improve the performance coefficient of the reversible circulation circuit in cooling mode.

According to a second connection variant for the second bypass branch A3 illustrated in FIGS. 3 to 5, the second bypass branch A3 still connects a third junction point 103 to a fourth junction point 104. Like the first variant of FIG. 2, the third junction point 103 is disposed on the main loop A1 downstream of the compressor 3, between said compressor 3 and the internal condenser 4. The fourth junction point 104 for its part has a different disposition. In this second variant, the fourth junction point 104 is disposed on the main loop A1 upstream of the second junction point 102, between the first heat exchanger 6 and said second junction point 102. Owing to this particular disposition of the fourth junction point 104, the first heat exchanger 6 is configured to allow the circulation of the refrigerant fluid within it in one direction or the other. Specifically, in a heat pump mode, the refrigerant fluid passes through the first heat exchanger 6 bound for the fourth junction point 104, whereas in cooling mode, the refrigerant fluid passes through the first heat exchanger 6 from the fourth junction point 104.

FIG. 3 shows a first example of this second variant, which is similar to that of FIG. 2 as regards the connections of the third bypass branch A4. The fifth junction point 105 is thus disposed on the first bypass branch A2 upstream of the second expansion device 7, between the first junction point 101 and said second expansion device 7. The sixth junction point 106 is also disposed on the first bypass branch A2 downstream of the cooler 8, between said cooler 8 and the second junction point 102.

In the same way as for the example of FIG. 2, in the example of FIG. 3 the circulation circuit A comprises a fourth bypass branch A5. The eighth junction point 108 is also disposed upstream of the third expansion device 9, on the first bypass branch A2 or the third bypass branch A4. However, the seventh junction point 107 is disposed on the main loop A1 downstream of the first expansion device 5, between said first expansion device 5 and the first heat exchanger 6.

Still in the first example illustrated in FIG. 3, the circulation circuit A may also comprise an internal heat exchanger 11a, 11b configured to allow exchanges of heat between a first side 11a, disposed on the fourth bypass branch A5, and a second side 11b disposed on the first bypass branch A2 or on the third bypass branch A4, downstream of the evaporator 10. In the first example illustrated in FIG. 3, the second side 11b of the internal heat exchanger is disposed on the first bypass branch A2, between the sixth junction point 106 and the second junction point 102, more particularly downstream of the accumulator 12. This internal heat exchanger 11a, 11b notably makes it possible to improve the performance coefficient of the reversible circulation circuit in cooling mode.

Both in the example of FIG. 2 and that of FIG. 3, the first bypass branch A2 may comprise a non-return valve 42 disposed so as to avoid backflows of refrigerant fluid from the fifth junction point 105 toward the first junction point 101.

FIG. 4 shows a second example of this second variant in which the connections of the second bypass branch A3 and the third bypass branch A4 are identical to those in the example of FIG. 3. The fifth junction point 105 is disposed on the first bypass branch A2 upstream of the second expansion device 7, between the first junction point 101 and said second expansion device 7. The sixth junction point 106 for its part is disposed on the first bypass branch A2 downstream of the cooler 8, between said cooler 8 and the second junction point 102.

The circulation circuit A also comprises a fourth bypass branch A5. The seventh junction point 107 of the latter is disposed on the main loop A1 downstream of the first expansion device 5, between said first expansion device 5 and the first heat exchanger 6. The eighth junction point 108 for its part is disposed on the main loop A1 upstream of the first expansion device 5, between the internal condenser 4 and said first expansion device 5. In order to avoid back-flows of refrigerant fluid coming from the first heat exchanger 6 in cooling mode in the main loop A1 from the seventh junction point 107 toward the first junction point 101, a non-return valve 45 may be disposed between said seventh junction point 107 and the first junction point 101.

In the second example illustrated in FIG. 4, the first expansion device 5, the second expansion device 7 and the third expansion device 9 may notably be integrated in one common element to save on space and ease of mounting within the motor vehicle. The first junction point 101, the fifth junction point 105 and the eighth junction point 108 can also be combined within the same structure with the expansion devices 5, 7 and 9. The first junction point 101, the fifth junction point 105 and the eighth junction point 108 may notably be combined at a single refrigerant fluid distribution and reception point.

Similarly, still in the second example illustrated in FIG. 4 and for the sake of compactness and mounting, the non-return valves 44, 45 and the seventh junction point 107 may be combined at a first end of the first heat exchanger 6. The first shut-off valve 31 and the third shut-off valve 33 and also the fourth junction point 104 may for their part be combined at a second end of the first heat exchanger 6, opposite the first end.

Still in the second example illustrated in FIG. 4, the circulation circuit A comprises an internal heat exchanger 11a, 11b configured to allow exchanges of heat between a first side 11a disposed on the fourth bypass branch A5 and a second side 11b disposed on the first bypass branch A2 or on the third bypass branch A4 downstream of the evaporator 10. In the second example illustrated in FIG. 4, the second side 11b of the internal heat exchanger is disposed on the first bypass branch A2, between the sixth junction point 106 and the second junction point 102, more particularly downstream of the accumulator 12. This internal heat exchanger 11a, 11b notably makes it possible to improve the performance coefficient of the reversible circulation circuit in cooling mode.

FIG. 5 shows a third example in which the fifth junction point 105 of the third bypass branch A4 is disposed on the main branch A1 downstream of the first junction point 101, between said first junction point 101 and the first expansion device 5. The sixth junction point 106 for its part is disposed on the first bypass branch A2 downstream of the cooler 8, between said cooler 8 and the second junction point 102. According to this third example illustrated in FIG. 5, like the first heat exchanger 6, the first expansion device 5 is also configured to allow the circulation of the refrigerant fluid within it in one direction or the other. This particular connection of the third bypass branch A4 makes it possible, in comparison with the first, second and third examples illustrated in FIGS. 2 to 4, to dispense with a fourth bypass branch A5 for the cooling mode.

The circulation circuit A then comprises an internal heat exchanger 11a, 11b configured to allow exchanges of heat between a first side 11a disposed on the main loop A1 upstream of the first expansion device 5 between the fifth junction point 105 and said first expansion device 5 and a second side 11b disposed on the first bypass branch A2 or on the third bypass branch A4 downstream of the evaporator 10. The second side 11b of the internal heat exchanger is in this case disposed on the first bypass branch A2, between the sixth junction point 106 and the second junction point 102, more particularly downstream of the accumulator 12. This internal heat exchanger 11a, 11b notably makes it possible to improve the performance coefficient of the reversible circulation circuit in cooling mode. The internal heat exchanger 11a, 11b is notably configured to allow the circulation of the refrigerant fluid within its first side 11a in one direction or the other.

Lastly, FIG. 6 shows a second connection embodiment for the first bypass branch A2. In this second embodiment, the first junction point 101 is disposed on the main loop A1 downstream of the first expansion device 5, between said first expansion device 5 and the first heat exchanger 6. The second junction point 102 for its part is still disposed on the main loop A1 upstream of the compressor 3, between the first heat exchanger 6 and said compressor 3.

In this second embodiment, the circulation circuit A is also reversible and comprises, like for the third example illustrated in FIG. 5, a second bypass branch A3 for bypassing the internal condenser 4 and the first expansion device 5. Similarly, the circulation circuit A may also comprise a third bypass branch A4 connected in parallel with the second expansion device 7 and the cooler 8.

The third junction point 103 of the second bypass branch A3 is disposed on the main loop A1 downstream of the compressor 3, between said compressor 3 and the internal condenser 4. The fourth junction point 104 for its part is disposed on the main loop A1 upstream of the second junction point 102, between the first heat exchanger 6 and said second junction point 102.

The fifth junction point 105 of the third bypass branch A4 is disposed on the first bypass branch A2 upstream of the second expansion device 7, between the first junction point 101 and said second expansion device 7. The sixth junction point 106 for its part is disposed on the first bypass branch A2 downstream of the cooler 8, between said cooler 8 and the second junction point 102. Like for the third example of FIG. 5, the third bypass branch A4 comprises a third expansion device 9 disposed upstream of an evaporator 10 through which a flow of internal air intended for the motor vehicle interior is intended to pass. The first heat exchanger 6 is also configured to allow the circulation of the refrigerant fluid within it in one direction or the other. By contrast to the third example illustrated in FIG. 5, it is not necessary here for the first expansion device 5 to be configured to allow the circulation of the refrigerant fluid within it in one direction or the other. This is because flow only occurs through the first expansion device 5 in a heat pump mode.

The circulation circuit A then comprises an internal heat exchanger 11a, 11b configured to allow exchanges of heat between a first side 11a disposed on the main loop A1 downstream of the first junction point 101, between said first junction point 101 and the first heat exchanger 6, and a second side 11b disposed on the first bypass branch A2 or on the third bypass branch A4 downstream of the evaporator 10. The internal heat exchanger 11*a*, 11*b* is also configured to allow the circulation of the refrigerant fluid within its first side 11*a* in one direction or the other.

Preferably, the first side 11*a* of the heat exchanger is selected such that it has a pressure drop equal to the pressure drop in the second expansion device 7 when the latter is open to its maximum extent. This notably makes it possible to balance the pressure drops in a heat pump mode with heat recovery between the refrigerant fluid coming from the first expansion device 5 and passing through the first heat exchanger 6 and that passing through the first bypass branch A2.

As a result, it can be clearly seen that, owing to the circulation of the refrigerant fluid in parallel within the first heat exchanger 6 and the cooler 8, the thermal management device 1 makes it possible to limit the pressure drops and thus avoids an increase in the power of the compressor 3 and in its energy consumption to compensate for these pressure drops.

The invention claimed is:

1. A thermal management device for an electric or hybrid motor vehicle, the thermal management device comprising:
a reversible circulation circuit configured to circulate a refrigerant fluid and which comprises:
a main loop, having, in the direction of circulation of the refrigerant fluid:
a compressor,
a first internal heat exchanger configured to directly or indirectly heat a flow of internal air en route to a vehicle interior of the electric or hybrid motor vehicle,
a first expansion device, and
a first heat exchanger;
a first bypass branch, which is connected in parallel at least with the first heat exchanger,
wherein the first bypass branch connects a first junction point disposed on the main loop upstream of the first expansion device, between the first internal heat exchanger and the first expansion device, to a second junction point disposed on the main loop upstream of the compressor, between the first heat exchanger and the compressor,
wherein the first bypass branch comprises a second expansion device disposed upstream of a cooler, and
wherein the cooler is configured to cool at least one of batteries or an electric powertrain of the electric or hybrid motor vehicle; and
a second bypass branch for bypassing the first internal heat exchanger and the first expansion device.

2. The thermal management device as claimed in claim 1, wherein the first heat exchanger is disposed both on the reversible circulation circuit and on an auxiliary circuit in which a heat transfer fluid is configured to circulate.

3. The thermal management device as claimed in claim 1, wherein the reversible circulation circuit comprises a third bypass branch connected in parallel with the second expansion device and with the cooler, and
wherein the third bypass branch comprises a third expansion device disposed upstream of an evaporator, through which the flow of internal air en route to the vehicle interior is configured to pass.

4. The thermal management device as claimed in claim 1, wherein the second bypass branch connects a third junction point disposed on the main loop downstream of the compressor, between the compressor and the first internal heat exchanger, to a fourth junction point disposed on the main loop downstream of the first expansion device, between the first expansion device and the first heat exchanger.

5. The thermal management device as claimed in claim 4, Wherein a third bypass branch connects a fifth junction point disposed on the first bypass branch upstream of the second expansion device, between a first junction point and the second expansion device, to a sixth junction point disposed on the first bypass branch downstream of the cooler, between the cooler and a second junction point,
the reversible circulation circuit further comprising a fourth bypass branch connecting a seventh junction point disposed on the main loop downstream of the first heat exchanger, between the first heat exchanger and the second junction point, to an eighth junction point disposed upstream of a third expansion device, on the first bypass branch or the third bypass branch.

6. The thermal management device as claimed in claim 5, wherein the reversible circulation circuit comprises a second internal heat exchanger configured to allow exchanges of heat between a first side disposed on the fourth bypass branch and a second side disposed on the first bypass branch or on the third bypass branch, downstream of an evaporator.

7. The thermal management device as claimed in claim 1, wherein the second bypass branch connects a third junction point disposed on the main loop downstream of the compressor, between the compressor and the first internal heat exchanger, to a fourth junction point disposed on the main loop upstream of a second junction point, between the first heat exchanger and the second junction point,
wherein the first heat exchanger is configured to allow the circulation of refrigerant fluid within it in one direction or the other.

8. The thermal management device as claimed in claim 7, wherein a third bypass branch connects a fifth junction point disposed on the first bypass branch upstream of the second expansion device, between a first junction point and the second expansion device, to a sixth junction point disposed on the first bypass branch downstream of the cooler, between the cooler and the second junction point,
the reversible circulation circuit moreover comprising a fourth bypass branch connecting a seventh junction point disposed on the main loop downstream of the first heat exchanger, between the first expansion device and the first heat exchanger, to an eighth junction point disposed upstream of a third expansion device, on the first bypass branch or the third bypass branch.

9. The thermal management device as claimed in claim 8, wherein the reversible circulation circuit comprises a second internal heat exchanger configured to allow exchanges of heat between a first side disposed on the fourth bypass branch and a second side disposed on the first bypass branch or on the third bypass branch, downstream of an evaporator.

10. The thermal management device as claimed in claim 7,
wherein a third bypass branch connects a fifth junction point disposed on the first bypass branch upstream of the second expansion device, between a first junction point and the second expansion device, to a sixth junction point disposed on the first bypass branch downstream of the cooler, between the cooler and the second junction point, the reversible circulation circuit further comprising a fourth bypass branch connecting a seventh junction point disposed on the main loop downstream of the first expansion device, between the first expansion device and the first heat exchanger, to an eighth junction point disposed on the main loop upstream of the first expansion device, between the first internal heat exchanger and the first expansion device.

11. The thermal management device as claimed in claim 10, wherein the reversible circulation circuit comprises a second internal heat exchanger configured to allow exchanges of heat between a first side disposed on the fourth bypass branch and a second side disposed on the first bypass branch or on the third bypass branch downstream of an evaporator.

12. The thermal management device as claimed in claim 7, wherein an third bypass branch connects a fifth junction point disposed on the main loop downstream of a first junction point, between the first junction point and the first expansion device, to a sixth junction point disposed on the first bypass branch downstream of the cooler, between the cooler and the second junction point, wherein the first expansion device is also configured to allow the circulation of the refrigerant fluid within it in one direction or the other.

13. The thermal management device as claimed in claim 12, wherein the reversible circulation circuit comprises a second internal heat exchanger configured to allow exchanges of heat between a first side disposed on the main loop upstream of the first expansion device between the fifth junction point and the first expansion device and a second side disposed on the first bypass branch or on the third bypass branch downstream of an evaporator, wherein the second internal heat exchanger is configured to allow the circulation of the refrigerant fluid within its first side in one direction or the other.

14. The thermal management device as claimed in claim 1, wherein the first bypass branch connects a first junction point disposed on the main loop downstream of the first expansion device, between the first expansion device and the first heat exchanger, to a second junction point disposed on the main loop upstream of the compressor, between the first heat exchanger and the compressor, wherein the second bypass branch connects a third junction point disposed on the main loop downstream of the compressor, between the compressor and the first internal heat exchanger, to a fourth junction point disposed on the main loop upstream of the second junction point, between the first heat exchanger and the second junction point, wherein the first heat exchanger is configured to allow the circulation of refrigerant fluid within it in one direction or the other.

\* \* \* \* \*